US005907738A

United States Patent [19]

Earle et al.

[11] Patent Number: 5,907,738

[45] Date of Patent: May 25, 1999

[54] PHOTOGRAPHIC PROCESSING APPARATUS

[75] Inventors: Anthony Earle, Harrow Weald; Leslie Wells, Ealing, both of United Kingdom

[73] Assignee: Eastman Kodak Company, Rochester, N.Y.

[21] Appl. No.: 08/881,833

[22] Filed: Jun. 25, 1997

[30] Foreign Application Priority Data

Jun. 20, 1996 [GB] United Kingdom .................. 9612893

[51] Int. Cl.[6] .............................. G03D 13/10; G03B 1/56

[52] U.S. Cl. .............................................. 396/652; 226/91

[58] Field of Search .................................... 396/612, 646, 396/647, 651, 652; 355/27–29; 226/91, 92

[56] References Cited

U.S. PATENT DOCUMENTS

| | | | |
|---|---|---|---|
| 4,065,042 | 12/1977 | Zielinski | 226/92 |
| 4,068,250 | 1/1978 | Anderson et al. | 396/603 |
| 4,188,108 | 2/1980 | Falomo | 396/652 |
| 4,279,371 | 7/1981 | Laar et al. | 226/91 |
| 4,576,321 | 3/1986 | Marson | 226/173 |
| 5,249,346 | 10/1993 | Kohler | 29/449 |
| 5,351,870 | 10/1994 | Nagel et al. | 396/652 |

*Primary Examiner*—D. Rutledge
*Attorney, Agent, or Firm*—Frank Pincelli

[57] ABSTRACT

A clip for use in a photographic processing apparatus which comprises at least one leader belt to which the material is attached for transportation along a processing path in the apparatus, the material being attached by means of a clip, the clip comprising a body portion to which the material is attached, and a clamp portion which is attached to the belt, characterized in that the clamp portion of the clip includes a recess formed therein for accommodating the belt in a substantially flat position.

3 Claims, 2 Drawing Sheets

PHOTOGRAPHIC PROCESSING APPARATUS

FIELD OF THE INVENTION

The present invention relates to photographic processing apparatus and is more particularly concerned with clips for use in such apparatus having leader belts for driving the material being processed therethrough.

BACKGROUND OF THE INVENTION

In large processing machines, one or more continuous leader belts are provided for transporting the photographic material to be processed, for example, photographic paper, along a processing path through the machine. These leader belts are located to one side of the processing path so as not to interfere with the movement of the material along the processing path. The leading end of the paper or other photographic material to be processed is attached to the moving leader belt by means of a metal clip. The material to be processed is threaded through a loop or slot formed in the clip, and the clip is attached to the moving belt.

When the clip is attached to the leader belt, it grips the belt so that it is held in a bowed or buckled configuration. This means that the belt is always deformed in regions where it is gripped by clips. Moreover, it may be difficult to grasp the moving belt so that the clip can be attached.

Furthermore, with the recent trend to reduce the amount of processing solution used when processing photographic material, large processing machines, of the type described above, have been adapted to operate with lower volumes of processing solution. In order to obtain the lower volumes, the width of the processing tanks in such machines need to be substantially reduced so that the material passes through a narrow processing channel which defines the processing path. This means that there is less clearance for the clip carrying the material to pass along the processing path as it is taken through the machine by the leader belt. As a result, the clip can come off the belt and/or jam in the narrow processing channel. Furthermore, the clip may bend in the narrow processing channels if it does not remain at approximately 90° to the belt. The material being processed may also tear as result of the clip detaching itself from the belt or jamming in the processing channel.

When these problems occur, the machine has to be stopped so that the clip and/or material can be recovered from the machine. This results in lost processing time, particularly if the machine is a multi-strand machine capable of processing several strands of material at one time. Moreover, components in the machine may need to be removed therefrom so that access to the clip and paper can be obtained, many of the components being heavy and difficult to lift.

Furthermore, clips as known in the art cause damage to the leader belt if they are not attached correctly or if they become dislodged from an optimum position on the belt. In particular, the belt is often distorted in the region where it is gripped by the clip.

SUMMARY OF THE INVENTION

It is, therefore, an object of the present invention to provide an improved clip which overcomes the problems mentioned above.

In accordance with one aspect of the present invention, there is provided a clip for use in a photographic processing apparatus which comprises at least one leader belt to which the material is attached for transportation along a processing path in the apparatus, the material being attached by means of a clip, the clip comprising:

a body portion to which the material is attached, and a clamp portion which is attached to the belt, characterized in that the clamp portion of the clip includes a recess formed therein for accommodating the belt in a substantially flat position.

Preferably, the recess has one edge thereof angled to allow the belt to be easily inserted into the clamp portion. In this case, at least one edge of the recess is angled for easy insertion of the belt into the clamp portion.

The improved clip in accordance with the present invention has the advantage that it remains substantially flat where it grips the belt and provides a close fit on the belt so that it remains at 90° thereto. This prevents the belt being damaged where it is gripped by the clip. Moreover, there is no distortion of the belt.

BRIEF DESCRIPTION OF THE DRAWINGS

For a better understanding of the present invention, reference will now be made, by way of example only, to the accompanying drawings in which.

DETAILED DESCRIPTION OF THE INVENTION

Improvements in clips for attaching photographic material to be processed to a leader belt are to be described which allows the use of these clips in processing machines which have been adapted for low volumes of processing solutions. Such clips are thinner and are capable of passing down the narrow processing channel and round the rollers in the machine more easily. Ideally, these clips remain at a nominal 90° angle to the belt and tend to increase the grip on the belt to compensate for increases in tension and/or drag of the photographic material which is to be processed.

Figure 1:
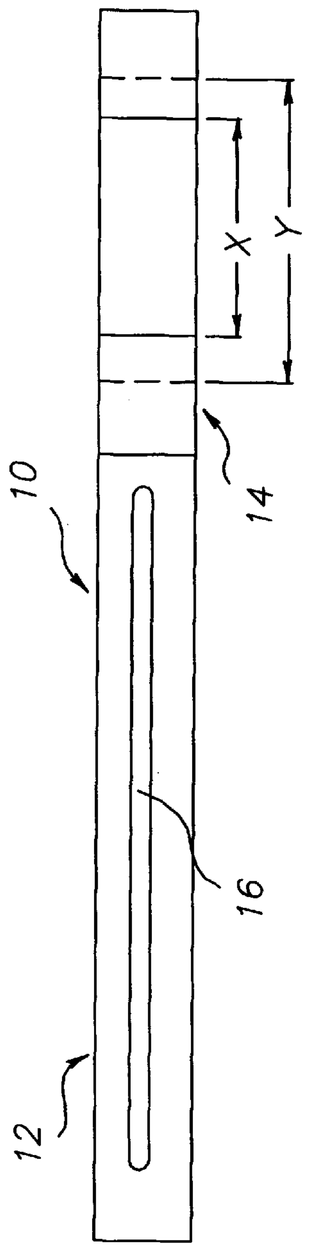
FIG. 1 is a plan view of one embodiment of a clip in accordance with the present invention.
Figure 2:
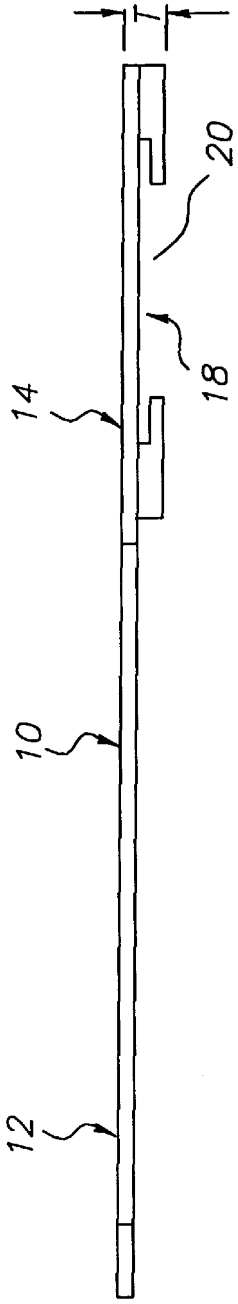
FIG. 2 is a side elevation of the clip shown in FIG. 1.
Figure 3:
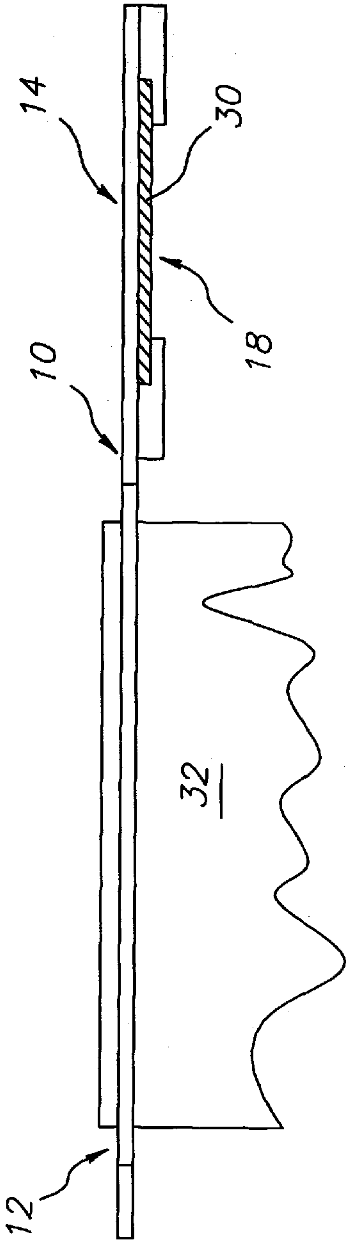
FIG. 3 is a side elevation similar to that shown in FIG. 2, but illustrating the clip when carrying material to be processed attached to a leader belt.
Figure 4:
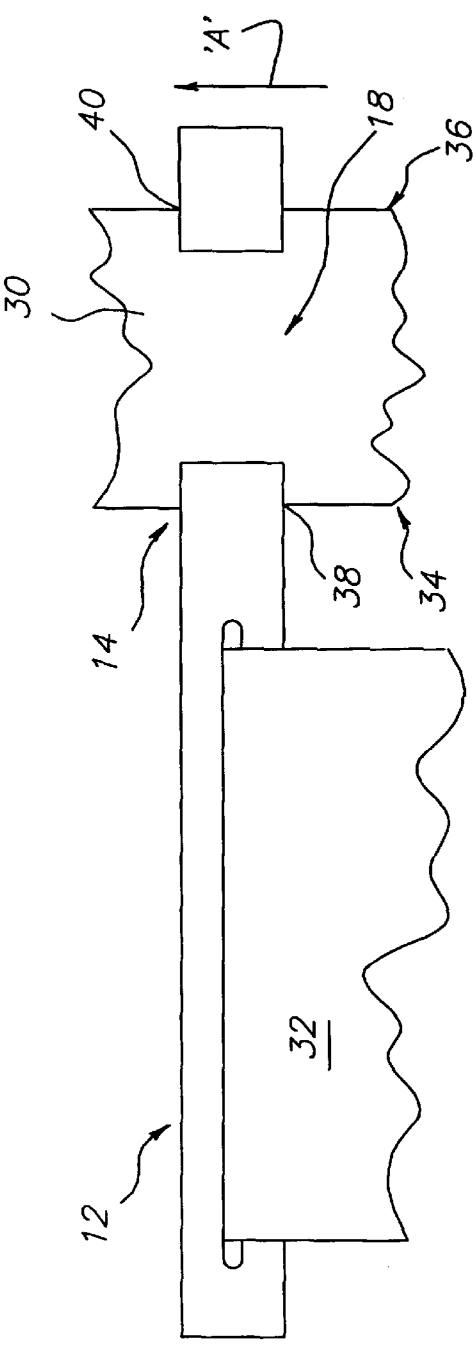
FIG. 4 is a plan view similar to FIG. 3.

In FIGS. 1 and 2, a clip 10 in accordance with the present invention is shown. The clip 10 comprises an elongated body portion 12 and a clamp portion 14. The body portion 12 has a slot 16 formed in it for receiving a leading end of a web of photographic material (not shown) which is to be transported along a processing path through the machine by a leader belt (also not shown). Clamp portion 14 comprises an outer slot 18 which connects with an inner recess 20. The slot 18 has a width X and the recess has a width W. The width W corresponds to the width of a leader belt (not shown) with which the clip 10 is to engage. Width X is 0.75W in this case, but it will be appreciated that any appropriate relationship between X and W may be used provided the clip can be retained on the belt as it passes around the rollers while facilitating easy attachment to the belt (as shown in FIGS. 3 and 4). The thickness T of the clamp portion 14 of the clip 10 is between 3 mm and 3.5 mm. It will be appreciated that thinner clips can be used, but depending on the material from which they are made, they may bend with handling. This provides a thinner clip/belt arrangement than is presently used.

FIGS. 3 and 4 show the clip 10 engaging a leader belt 30 and carrying a piece of photographic material 32, for example, photographic paper. A sectioned view through the belt 30 is shown. Material 32 is inserted into slot 18 and folded over. The clamp portion 14 carries the belt 30 in the recess 20 so that it lies substantially flat. The direction of travel of the belt 30 is indicated by arrow 'A' in FIG. 4. The clip 10 is substantially perpendicular to the belt 30.

Drag due to the photographic paper being pulled through the machine tends to cause the clip 10 to twist through a small angle, around 1° or 2°, in the opposite direction to the direction of travel of the belt 30, that is, in the direction opposite to that shown by arrow 'A'. This means that the clip 10 cams against longitudinal edges 34,36 of the belt 30 at the locations indicated by reference numerals 38,40 so that a better grip is achieved between the clip 10 and the belt 30 at these locations.

Figure 5:
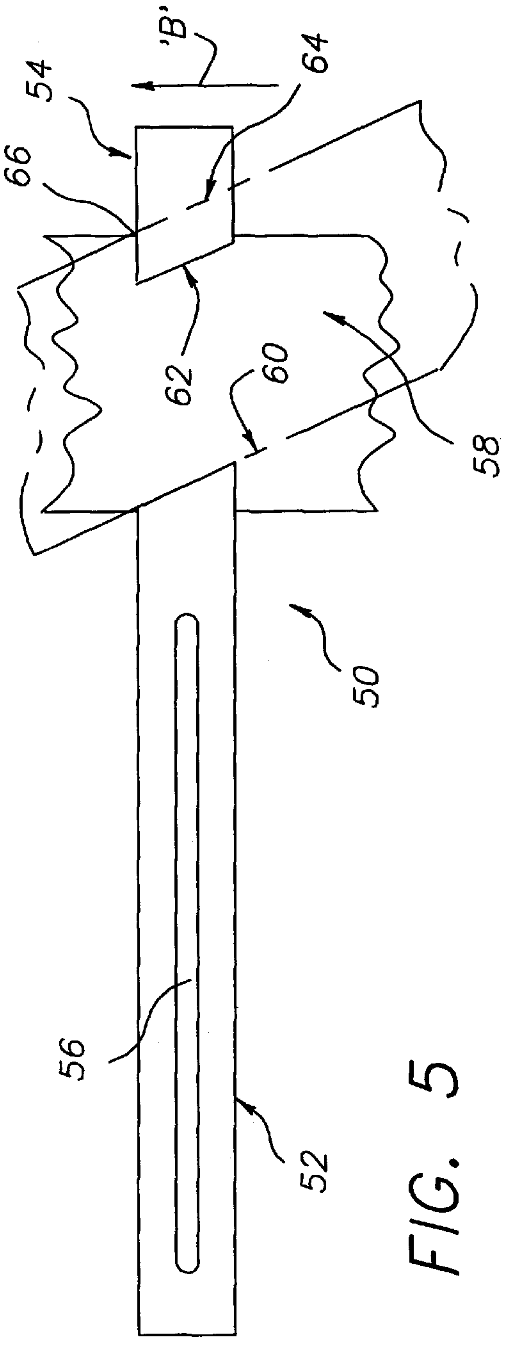
FIG. 5 is a plan view of a second embodiment of a clip in accordance with the present invention.

FIG. 5 illustrates a further embodiment of a clip in accordance with the present invention. Clip 50 has a body portion 52 and a clamp portion 54 as before. Body portion 52 is identical to body portion 12 of clip 10 and includes a slot 56 for retaining photographic material to be processed (not shown). Clamp portion 54 has a slot 58 which is angled with respect to the direction of travel of the leader belt 30, as indicated by arrow 'B', to which the clip 50 is attached. The slot 58 connects with a recess (not shown) in which the belt 30 lies when the clip 50 is attached to it. Edges 60,62 of the angled slot 58 are parallel to one another and are spaced apart a distance so that the belt 30 can be inserted under the edge 62 into cut away portion 64 and then slipped under edge 60 as shown by dotted lines. After insertion into the slot 58, the clip 50 is straightened to the position shown in solid lines. As before the clip 50 grips the belt 30 at location 66 maintaining it in a substantially flat configuration.

Edge 62 may be straight, that is, be parallel to the longitudinal edges 34,36 of the belt 30 as shown in FIG. 4 provided the cut away portion 64 is present so that the belt 30 can be inserted under the edge 62 and into that portion.

It will be readily appreciated that clips in accordance with the present invention can be used to advantage in standard processing machines having leader belts as they are not easily detached from the belt. Moreover, the life of the belt is prolonged as the clip is not distorting the belt in the region where it is attached.

It is to be understood that various other changes and modifications may be made without departing form the scope of the present invention, the present invention being limited by the following claims.

| PARTS LIST | |
|---|---|
| 10 | clip |
| 12 | body portion |
| 14 | clamp portion |
| 18 | outer slot |
| 20 | inner recess |
| 30 | leader belt |
| 32 | photographic material |
| 34, 36 | longitudinal edges |
| 38, 40 | locations |
| 50 | clip |
| 52 | body portion |
| 54 | clamp portion |
| 56, 58 | slot |
| 60, 62 | edges |
| 64 | cut away portion |
| 66 | location |

What is claimed is:

1. A clip for use in a photographic processing apparatus which comprises at least one leader belt to which the material is attached for transportation along a processing path in the apparatus, the material being attached by means of a clip, the clip comprising; a body portion to which the material is attached, and a clamp portion which is attached to the belt, characterized in that the clamp portion of the clip includes a recess formed therein for accommodating the belt in a substantially flat position, the clip being of planar configuration and the belt and clip lying in substantially the same plane.

2. A clip according to claim 1, wherein the recess has one edge thereof angled to allow the belt to be easily inserted into the clamp portion.

3. A clip according to claim 2, wherein at least one edge of the recess is angled for easy insertion of the belt into the clamp portion.

* * * * *